(12) United States Patent
Lin

(10) Patent No.: US 11,630,573 B1
(45) Date of Patent: Apr. 18, 2023

(54) HOVER TOUCH DEVICE WITH SENSORY FEEDBACK

(71) Applicant: EMERGING DISPLAY TECHNOLOGIES CORP., Kaohsiung (TW)

(72) Inventor: Po-Wei Lin, Kaohsiung (TW)

(73) Assignee: EMERGING DISPLAY TECHNOLOGIES CORP., Kaohsiung (TW)

(*) Notice: Subject to any disclaimer, the term of this patent is extended or adjusted under 35 U.S.C. 154(b) by 0 days.

(21) Appl. No.: 17/713,211

(22) Filed: Apr. 4, 2022

(30) Foreign Application Priority Data

Nov. 19, 2021 (TW) .................................. 110143249

(51) Int. Cl.
*G06F 3/04883* (2022.01)
*G06F 3/044* (2006.01)
*G06F 3/041* (2006.01)
*G06F 3/16* (2006.01)
*G06F 3/147* (2006.01)

(52) U.S. Cl.
CPC ........ *G06F 3/04883* (2013.01); *G06F 3/0447* (2019.05); *G06F 3/04166* (2019.05); *G06F 3/147* (2013.01); *G06F 3/167* (2013.01); *G06F 2203/04101* (2013.01); *G06F 2203/04108* (2013.01)

(58) Field of Classification Search
CPC ...... G06F 3/147; G06F 3/167; G06F 3/04166; G06F 3/0447; G06F 3/04883; G06F 2203/04101; G06F 2203/04108
See application file for complete search history.

(56) References Cited

U.S. PATENT DOCUMENTS

| | | | |
|---|---|---|---|
| 9,229,573 B2* | 1/2016 | Igarashi | G06F 3/0488 |
| 9,703,430 B2* | 7/2017 | Hoch | G06F 3/0446 |
| 10,055,059 B2* | 8/2018 | Lee | G06F 3/04186 |
| 10,261,622 B2 | 4/2019 | Varlamov et al. | |

(Continued)

FOREIGN PATENT DOCUMENTS

| | | |
|---|---|---|
| CN | 105373273 B | 11/2019 |
| CN | 110908571 A | 3/2020 |

(Continued)

*Primary Examiner* — Michael Pervan
(74) *Attorney, Agent, or Firm* — Muncy, Geissler, Olds & Lowe, P.C.

(57) ABSTRACT

A hover touch device with sensory feedback includes: a capacitive touch panel, and a touch driver chip which drives the capacitive touch panel to generate and output a sensing information; based on the sensing information, an embedded system determines whether a conducting object is inside an effective region. The embedded system calculates spatial coordinates of the conductive object, and outputs the spatial coordinates to a graphical user interface, so that the graphical user interface displays a position feedback image on a display device based on the spatial coordinates of the conductive object as a visual feedback. After the embedded system recognizes a hovering gesture event, a speaker generates a hovering gesture event feedback sound as an auditory feedback. The embedded system also makes the speaker broadcast a warning sound when a user's finger contacts the capacitive touch panel.

10 Claims, 12 Drawing Sheets

(56) References Cited

U.S. PATENT DOCUMENTS

| | | | |
|---|---|---|---|
| 10,732,818 B2* | 8/2020 | Won | G06F 3/0488 |
| 2014/0184551 A1* | 7/2014 | Igarashi | G06F 3/044 |
| | | | 345/173 |
| 2014/0184552 A1* | 7/2014 | Tanemura | G06F 3/0446 |
| | | | 345/174 |
| 2015/0378467 A1* | 12/2015 | Hoch | G06F 3/0443 |
| | | | 345/174 |
| 2017/0351397 A1* | 12/2017 | Won | G06F 3/046 |
| 2018/0011597 A1* | 1/2018 | Lee | G06F 3/04842 |
| 2021/0303076 A1* | 9/2021 | Abe | G06F 3/044 |

FOREIGN PATENT DOCUMENTS

| | | |
|---|---|---|
| CN | 107980116 B | 4/2021 |
| TW | I703490 B | 9/2020 |
| TW | 202132951 A | 9/2021 |

\* cited by examiner

HOVER TOUCH DEVICE WITH SENSORY FEEDBACK

CROSS REFERENCE TO RELATED APPLICATION(S)

This non-provisional application claims the benefit under 35 U.S.C. § 119(e) to patent application No. 110143249 filed in Taiwan on Nov. 19, 2021, which is hereby incorporated in its entirety by reference into the present application.

BACKGROUND OF THE INVENTION

1. Field of the Invention

The present invention relates to a hover touch device, especially to a hover touch device with sensory feedback.

2. Description of the Related Art

Under the global pandemic, demands have been risen for software services and hardware equipment such as personal computers, tablets, and monitors. Since surfaces of objects are potentially subject to virus contamination, people tend to avoid touching the objects directly. Such scenario increases demands for non-contact touch products. The hover touch device 30 shown in FIG. 10 is based on a non-contact touch technology wherein a finger is placed above the hover touch device 30 at a distance d1 to operate the hover touch device 30. As shown in FIG. 11, in applications of conventional hover touch devices 30, it is often hard to accurately estimate a distance of a finger relative to a display in a three-dimensional space due to user's limited line of sight which tends to cause false touch events or inadvertent direct touch with the display device. For example, when a user looks at the operation of his/her index finger, he/she tends to judge along the direction of the line of sight that the distance between the index finger and the hover touch device 30 is d2. However, the hover touch device 30 actually senses the distance between the index finger and the hover touch device 30 to be a distance d3, and hence false touch events or inadvertent direct touch with the display device are likely to happen.

When a user uses a conventional touch screen, a tactile feedback from the user's finger tells the user whether the touch screen is being correctly operated. However, it is more difficult for a user to operate a conventional hover touch product, because the user solely relies on personal vision to determine adequate operating distances for his/her fingers, which tends to result in false touch events or inadvertent direct touches with the display device.

Therefore, there is an urgent need to solve the problem that it is difficult for a user to adequately determine operating distances of his/her fingers when the user operates a conventional hover touch product.

SUMMARY OF THE INVENTION

In order to solve the above problem, the present invention proposes a hover touch device with sensory feedback, which collaborates with a graphical user interface on a display device and a sound generating device such as a speaker. Graphics generated on the display device through the graphical user interface are utilized as visual feedback information to assist the user's vision, so that after the user perceives the visual feedback information, the user can determine whether gestures performed by the user on the hover touch device are carried out as expected.

The hover touch device with sensory feedback of the present invention includes:
a capacitive touch panel for sensing a conductive object adjacent to the capacitive touch panel;
a touch driver chip, electrically connected with the capacitive touch panel, driving the capacitive touch panel and measuring sensing signals induced by the conductive object, and then generating and outputting a sensing information accordingly;
an embedded system, electrically connected to the touch driver chip and receiving the sensing information output by the touch driver chip;
the embedded system generating a sensed depth information of the conductive object according to the sensing information, and determining whether the conductive object is located inside an effective sensing region according to the sensed depth information, and when the conductive object is located inside the effective sensing region, the embedded system calculates spatial coordinates of the conductive object, and outputs the spatial coordinates to a graphical user interface, so that the graphical user interface displays a position feedback image on a display device based on the spatial coordinates of the conductive object.

Preferably, the embedded system calculates a vertical axis coordinate of the conductive object according to the sensing information of the conductive object to obtain a vertical axis distance between the conductive object and the capacitive touch panel, when the vertical axis distance is less than a warning distance, the embedded system sends a warning sound feedback signal to a speaker, such that the speaker broadcasts a warning sound to notify that the conductive object touches the capacitive touch panel.

Preferably, the embedded system simultaneously outputs a hovering gesture event sound feedback signal to a speaker, so that the speaker generates a hovering gesture event feedback sound.

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of, not all of, the embodiments of the present invention. Based on the embodiments of the present invention, all other embodiments obtained by a person of ordinary skill in the art without creative efforts shall fall within the protection scope of the present invention.

Figure 1:
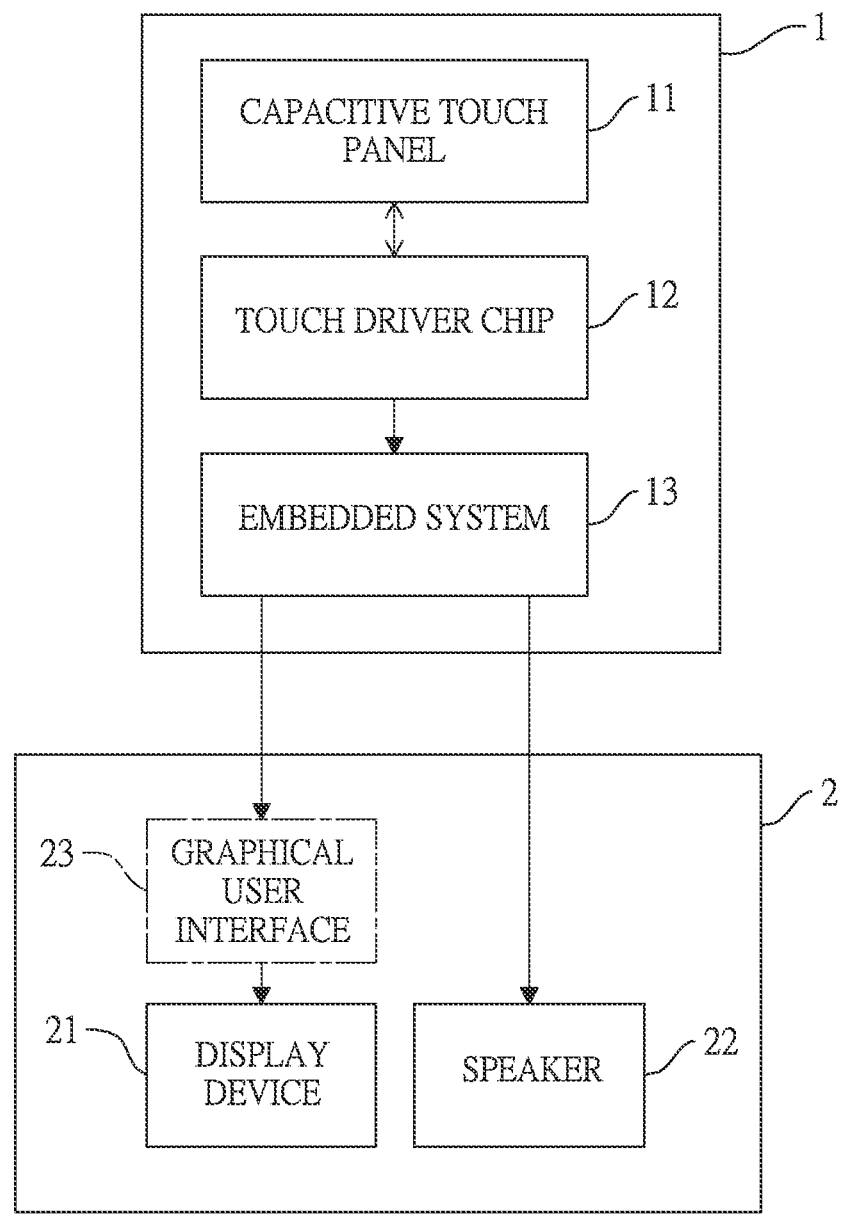
FIG. 1 is a schematic diagram of a hover touch device with sensory feedback of the present invention in collaboration with a system end.

Please refer to FIG. 1. In addition to showing a hover touch device 1 of the present invention, FIG. 1 also shows a system end 2 collaborating with the hover touch device 1 of the present invention. The hover touch device 1 of the present invention includes a capacitive touch panel 11, a touch driver chip 12 and an embedded system 13. The system end 2 includes a display device 21, a speaker 22 and a graphical user interface 23.

The capacitive touch panel 11 is a passive device, and its main function is to sense a conductive object in a space in front of the sensing surface of the capacitive touch panel 11. The touch driver chip 12 is an active device with analog circuits capable of outputting analog signals to drive a plurality of sensing structures on the capacitive touch panel 11 to measure sensing signals induced by a conductive object over the sensing structures, and thereby a sensing information is generated and output to the embedded system 13. The embedded system 13 can perform calculations based on the sensing information to obtain spatial coordinates of the conductive object, and further proceed to perform recognition calculations for hovering gesture events. The embedded system 13 can be a microcontroller IC with embedded architectures, having embedded memories or having access to external memories.

The system end 2 refers to an application device adopting the hover touch device 1, such as an automatic coffee maker. In the system end 2, the display device 21 displays a graphical user interface 23. The graphical user interface 23 can receive spatial coordinates of a conductive object and hovering gesture events sent from the hover touch device 1, and send out related images. The speaker 22 can receive signals from the hover touch device 1 to generate sounds accordingly.

Figure 2A:
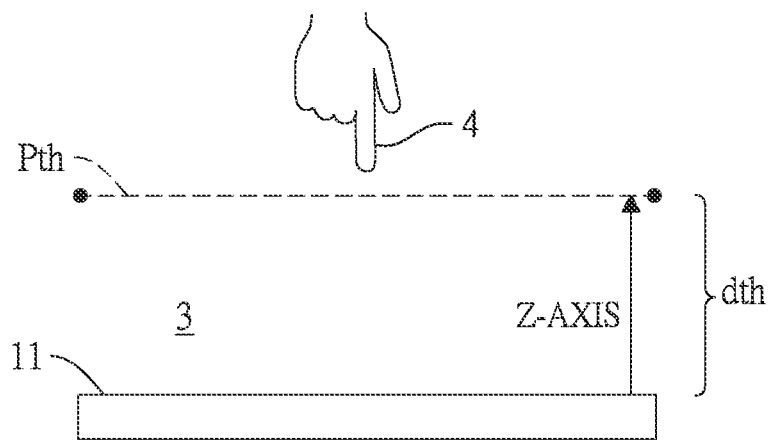
FIGS. 2A-2B are schematic diagrams of an effective threshold and an effective sensing region of the present invention.
Figure 2B:
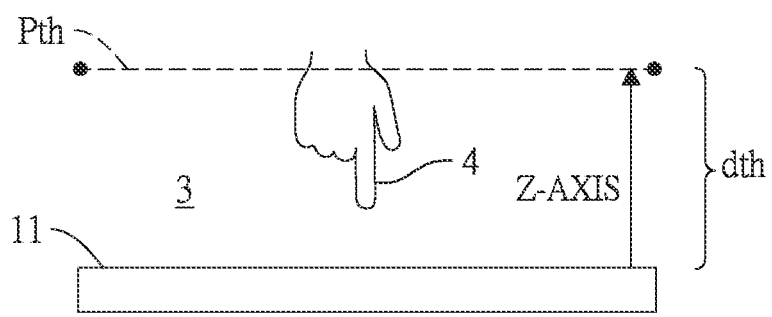

After receiving the sensing information from the touch driver chip 12, the embedded system 13 will firstly check a sensed depth information of the conductive object. Please refer to FIGS. 2A and 2B. FIG. 2A shows a threshold plane Pth which is located in front of the capacitive touch panel 11 and with a z-axis threshold distance dth from the sensing surface of the capacitive touch panel 11. The z-axis is perpendicular to the sensing surface of the capacitive touch panel 11, and the threshold plane Pth is used for dividing the space in front of the sensing surface of the capacitive touch panel 11 into an effective sensing region 3 and a region outside of the effective sensing region 3.

The embedded system 13 determines whether the sensed depth information of a finger 4 (i.e. the conductive object) is greater than the z-axis threshold distance dth. When the embedded system 13 determines the sensed depth information of the finger 4 (i.e. the conductive object) is greater than the z-axis threshold distance dth, the embedded system 13 determines that the finger 4 (i.e. the conductive object) is located outside of the effective sensing region 3. On the contrary, when the embedded system 13 determines that the sensed depth information of the finger 4 (i.e. the conductive object) is less than the z-axis threshold distance dth and greater than a warning distance, the embedded system 13 determines that the finger 4 (i.e. the conductive object) is inside the effective sensing region 3, and when the embedded system 13 determines that the sensed depth information of the finger 4 (i.e. the conductive object) is less than or equal to the warning distance, the embedded system 13 determines that the finger 4 (i.e., the conductive object) has contacted the surface of the capacitive touch panel 11, and the embedded system 13 will send a warning sound feedback signal to the speaker 22 at this moment, so that the speaker 22 accordingly broadcasts a warning sound to notify a user that he/she has inadvertently contacted the surface of the capacitive touch panel 11.

When the embedded system 13 determines that a conductive object is inside the effective sensing region 3, the embedded system 13 will calculate spatial coordinates (x,y,z) of the conductive object, where x-axis and y-axis are parallel to the sensing surface of the capacitive touch panel 11, and the z-axis is perpendicular to the sensing surface of the capacitive touch panel 11, and when the z value is zero, it means that the conductive object is in contact with the sensing surface of the capacitive touch panel 11, and when the z value is positive, it means that the vertical distance between the conductive object and the sensing surface of the capacitive touch panel 11 is the z value, and at this moment, if a related application with a feedback function is turned on, the embedded system 13 can provide auditory feedback and visual feedback to the system end 2.

Figure 3:
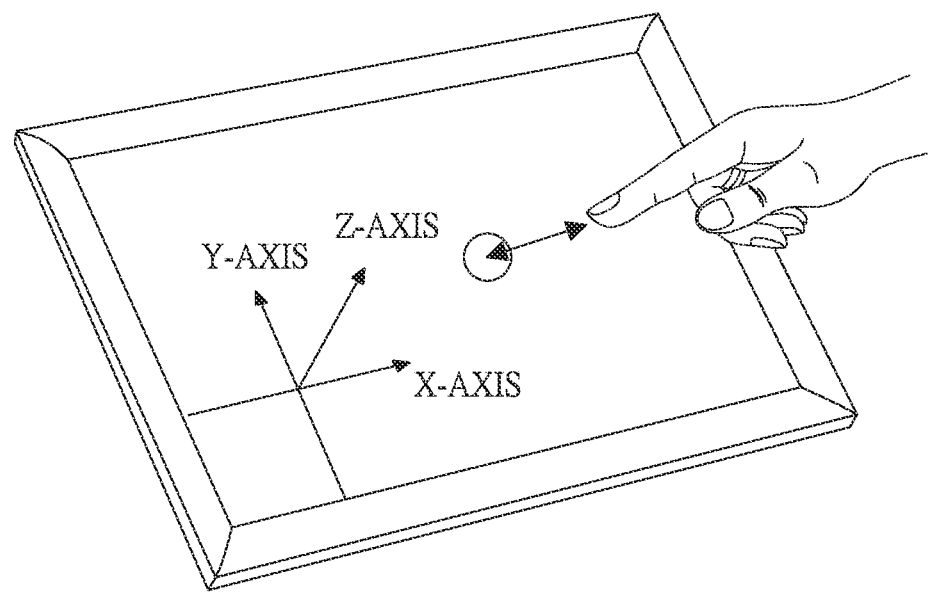
FIG. 3 is a schematic diagram of visual feedback of the hover touch device with sensory feedback of the present invention.
Figure 4:
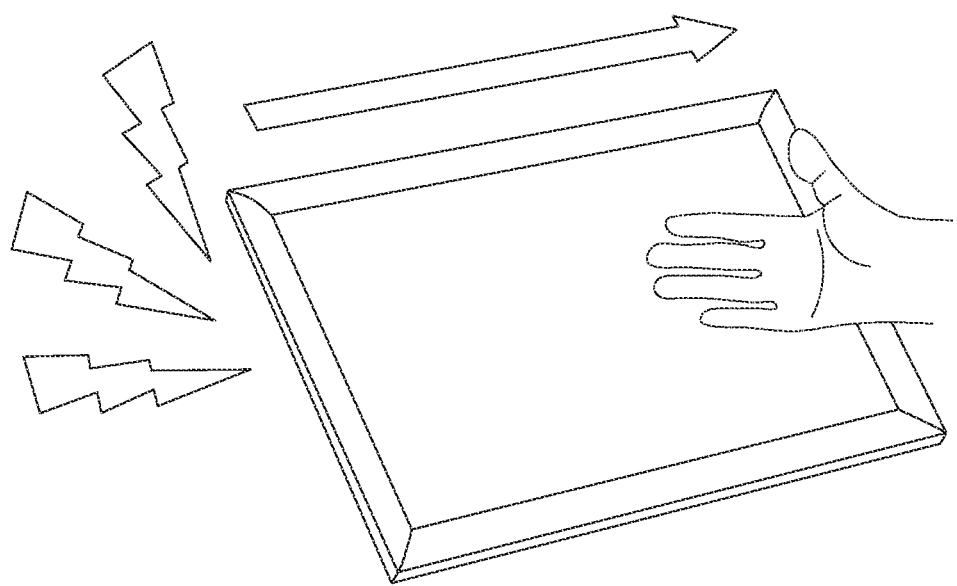
FIG. 4 is a schematic diagram of auditory feedback of the hover touch device with sensory feedback of the present invention.

Please refer to FIG. 3. When the embedded system 13 provides visual feedback to the system end 2, the embedded system 13 outputs current spatial coordinates (x,y,z) of the finger 4 (i.e., the conductive object) to the graphical user interface 23, so that the graphical user interface 23 displays on the display device 21 a current position feedback image of the current spatial coordinates (x,y,z) corresponding to the finger 4 (i.e., the conductive object), for example a circle projected by the finger 4 is shown in FIG. 3; at this moment, with reference to FIG. 4, when the embedded system 13 determines that a hovering gesture event is occurring, the embedded system 13 provides auditory feedback to the system end 2, that is, the embedded system 13 sends a hovering gesture event feedback signal to the speaker 22, so that the speaker 22 may generate a hovering gesture event feedback sound.

Figure 5:
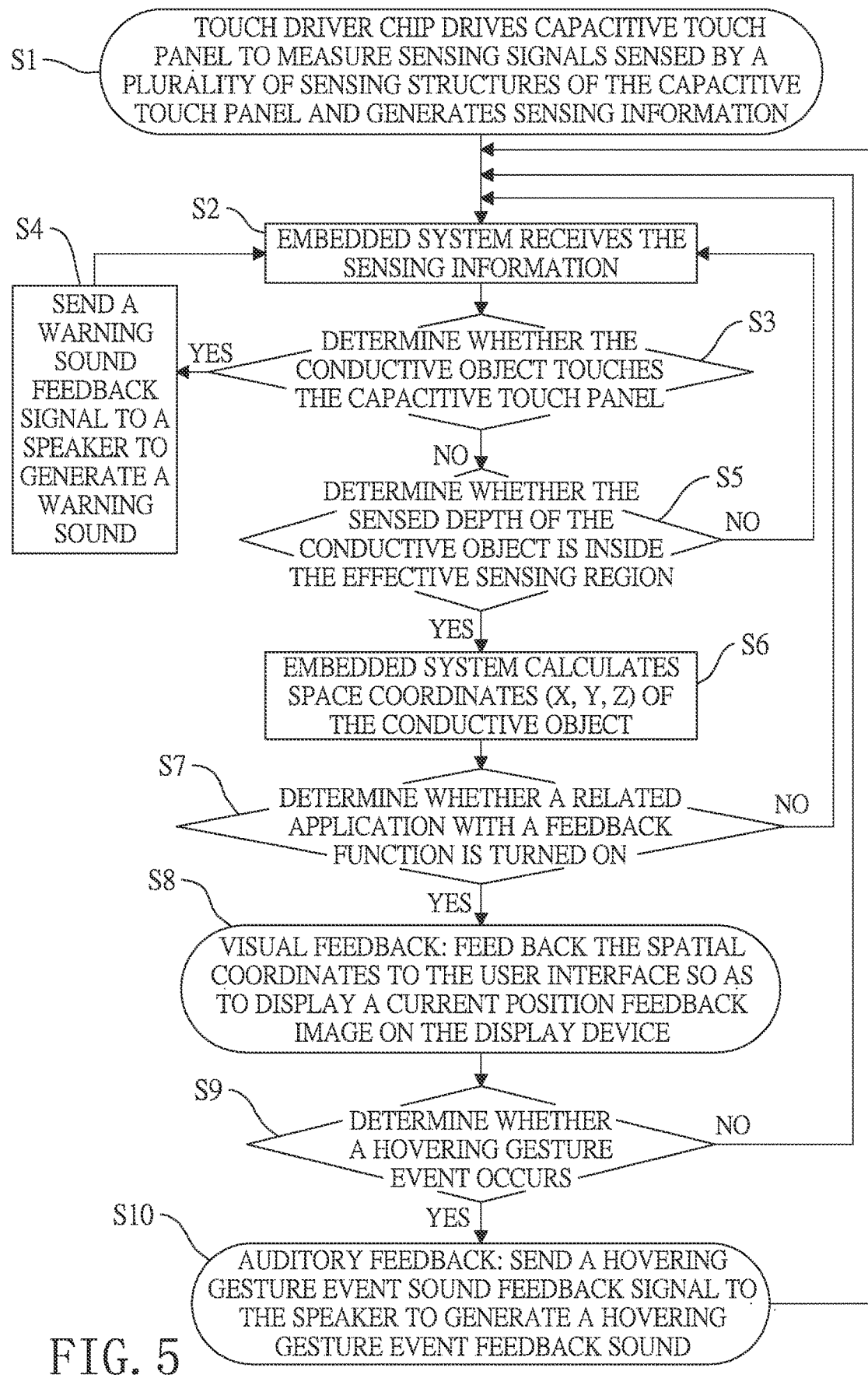
FIG. 5 is a flow chart of the spatial coordinate sensing and feedback of the present invention.

Referring to FIG. 5, the above process flow is organized into a spatial coordinate sensing and feedback process flow, which includes the following steps:

Step S1: The touch driver chip 12 drives the capacitive touch panel 11 to measure sensing signals sensed by the plurality of sensing structures of the capacitive touch panel 11, and generates a sensing information accordingly.

Step S2: The embedded system 13 receives the sensing information.

Step S3: The embedded system 13 determines whether the conductive object touches the capacitive touch panel 11. If the conductive object does not touch the capacitive touch panel, the flow jumps to step S5.

Step S4: The embedded system 13 sends a warning sound feedback signal to the speaker 22 to generate warning sound, and the flow returns to Step S2.

Step S5: The embedded system 13 determines whether the sensed depth of the conductive object is inside the effective sensing region 3. If the sensed depth of the conductive object is outside the effective sensing region 3, the flow returns to step S2.

Step S6: The embedded system 13 calculates spatial coordinates (x,y,z).

Step S7: The embedded system 13 determines whether a related application with the feedback function is turned on. If the related application with the feedback function is not turned on, the flow returns to step S2.

Step S8: (visual feedback) The embedded system 13 feeds back the spatial coordinates of the conductive object to the user interface 23 to display a current position feedback image on the display device 21.

Step S9: The embedded system 13 determines whether a hovering gesture event occurs. If no hovering gesture event occurs, the flow jumps back to step S2.

Step S10: (auditory feedback) The embedded system 13 sends a hovering gesture event sound feedback signal to the speaker 22, so that the speaker 22 generates a hovering gesture event feedback sound, and the flow returns to step S2.

Please refer to FIGS. 6A-6D. FIGS. 6A-6D are about an embodiment of the present invention regarding the hovering tap gesture event incorporated with the graphical user interface. FIGS. 6A-6D show a display device and a graphical user interface of an automatic coffee maker. The automatic coffee maker adopts a hover touch device 1 of the present invention. As the hover touch device 1 collaborates with the graphical user interface, the hover touch device 1 has a feedback function.

Figure 6A:
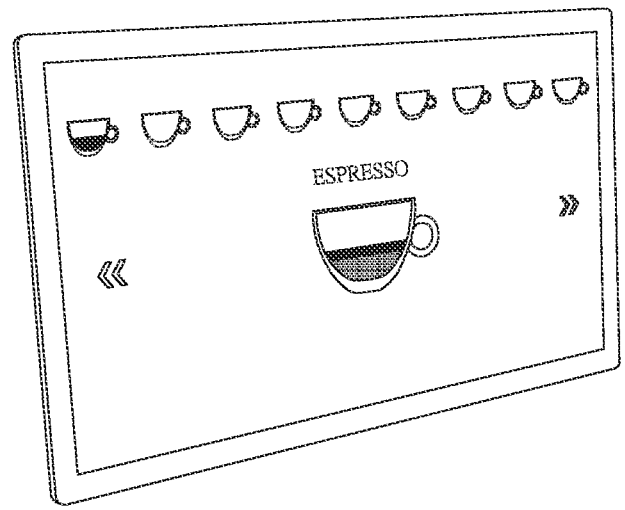
FIGS. 6A-6D are schematic diagrams of a hovering tap gesture incorporated with the graphical user interface of the present invention.
Figure 6B:
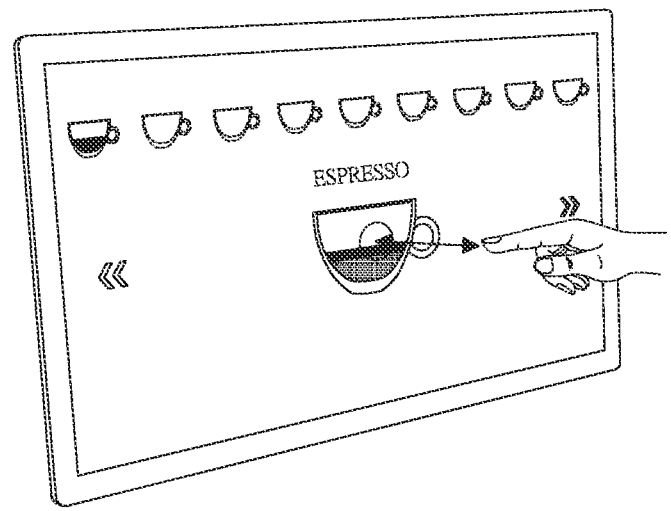
Figure 6C:
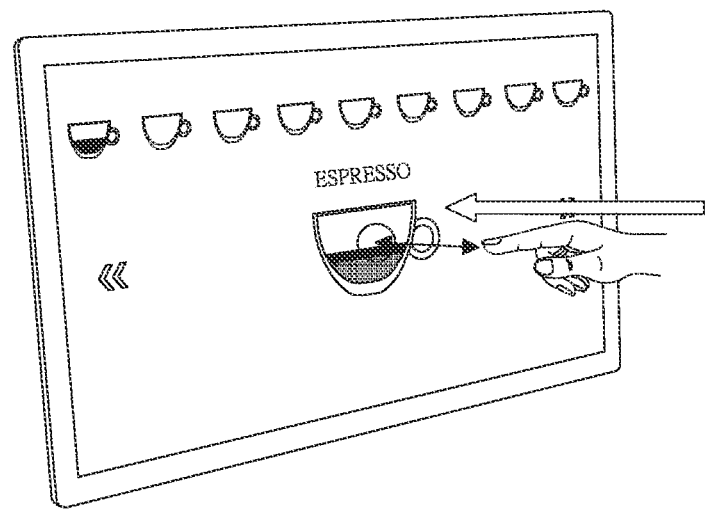
Figure 6D:
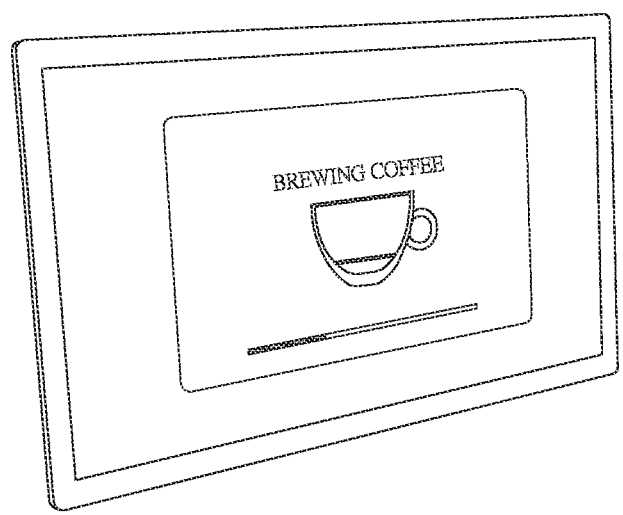

In FIG. 6A, the graphical user interface displays a cup of Espresso on the display device. At this time, the user does not operate the graphical user interface, so the hover touch device 1 is in an idle, no sensing state. In FIG. 6B, a user's finger enters the effective sensing region 3 of the hover touch device 1, and at this moment, a circular feedback image of the finger (i.e., the above-mentioned current position feedback image) appears on top of that cup of Espresso. In FIG. 6C, in a direction shown by an arrow, after the user's finger approaches the touch panel, a hovering tap gesture event is triggered. Accordingly, a speaker 22 receives a hovering gesture event sound feedback signal, so that the speaker 22 generates a hovering gesture event feedback sound, and the graphical user interface receives a hovering tap gesture event trigger signal, and then in FIG. 6D, the graphical user interface shows that the automatic coffee maker starts to brew Espresso according to the hovering tap gesture event trigger signal.

Please refer to FIGS. 7A-7D. FIGS. 7A-7D are about an embodiment of the present invention regarding the hovering swipe gesture event incorporated with the graphical user interface. 7A-7D show a display device and a graphical user interface of an automatic coffee maker. The automatic coffee maker has the hover touch device 1 of the present invention. After the hover touch device 1 is collaborating with the graphical user interface, the hover touch device 1 has a feedback function.

Figure 7A:
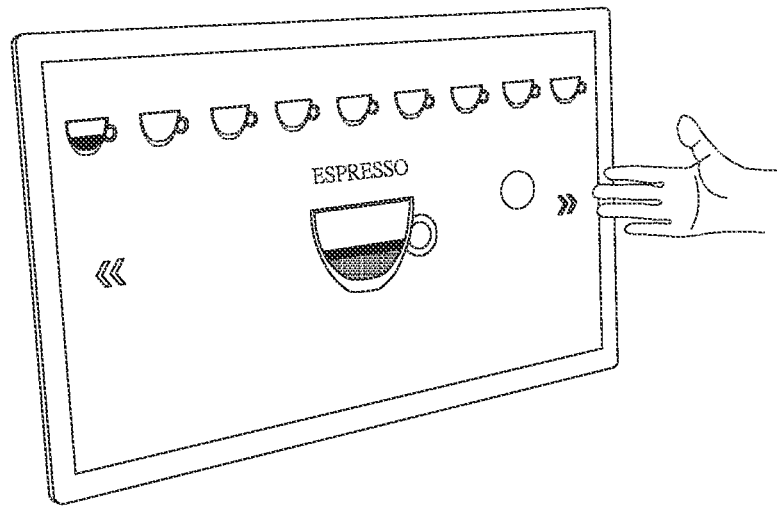
FIGS. 7A-7D are schematic diagrams of a hovering swipe gesture incorporated with the graphical user interface of the present invention.
Figure 7B:
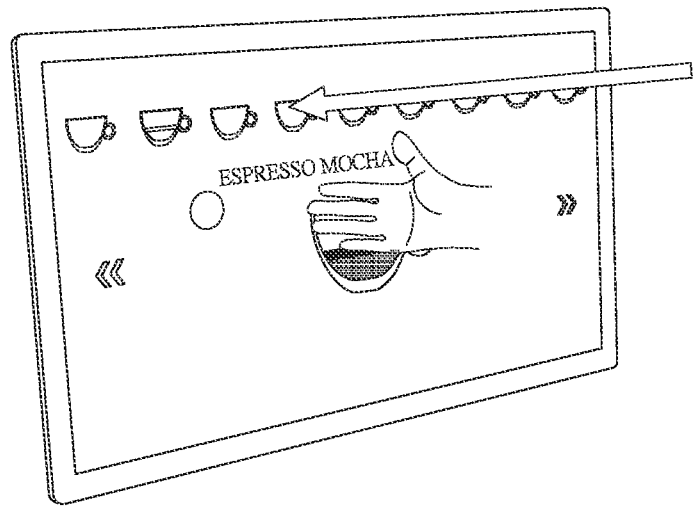

In FIG. 7A, the graphical user interface displays a cup of Espresso coffee on the display device. At this time, the user's finger enters the effective sensing region 3 of the hover touch device 1. In the effective sensing region 3, a circular feedback image of the finger appears to the right side of the cup of Espresso. In FIG. 7B, in the direction shown by an arrow, the user's finger slides to the left in the effective sensing region, and a circular feedback image of the finger appears on the left side of the cup of Espresso. At this time, a hovering swipe gesture event is triggered, accordingly, a speaker receives a hovering gesture event sound feedback signal, so that the speaker 22 generates a hovering gesture event feedback sound, and the graphical user interface receives a hovering swipe gesture event trigger signal, so that the graphical user interface displays a cup of Espresso Mocha on the display device. It can be known that the previous cup of Espresso is replaced by the current cup of Espresso Mocha, which means that the user is browsing various coffee options with the hovering swipe gesture.

Figure 7C:
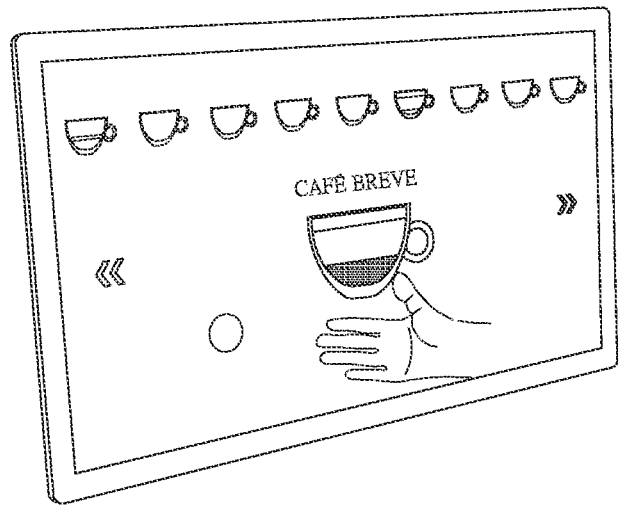
Figure 7D:
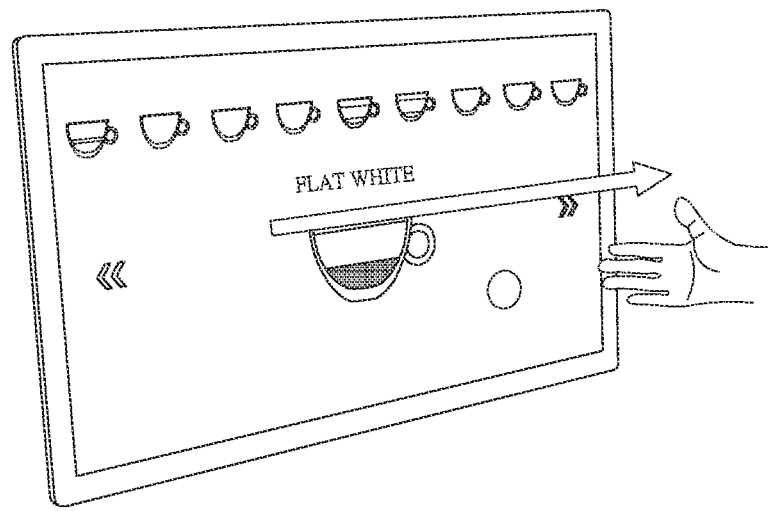

Similarly, in FIG. 7C, a circular feedback image of the user's finger is on the left side of a cup of Café Breve, and then in FIG. 7D, as shown by the arrow, the user's finger swipes to the right in the effective sensing region, and a circular feedback image of the finger appears on the right side of the cup of Café Breve. At this time, a hovering swipe gesture event is triggered. Accordingly, the speaker 22 receives a hovering gesture event sound feedback signal and generates a hovering gesture event feedback sound, and the graphical user interface receives a hovering swipe gesture event trigger signal, so that the graphical user interface displays a cup of Flat White on the display device. It can be seen that the previous cup of Café Breve has been replaced by the cup of Flat White, which indicates that the user is browsing various coffee options with the hovering swipe gesture.

Please refer to FIGS. 8A-8D. FIGS. 8A-8D are about an embodiment of the present invention related to hovering gesture events incorporated with a graphical user interface, wherein the user operates the function keys provided by the graphical user interface with a hovering hold gesture. FIGS. 8A-8D show a display device and a graphical user interface adopted by an automatic coffee maker. The automatic coffee maker has a hover touch device 1 of the present invention. After the hover touch device 1 collaborates with the graphical user interface, the hover touch device 1 has a feedback function.

Figure 8A:
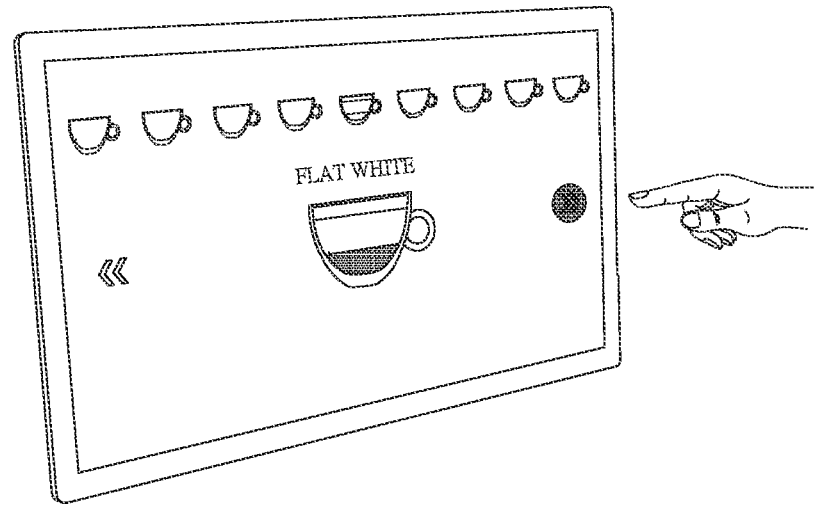
FIGS. 8A-8D are schematic diagrams of a hovering hold gesture incorporated with the graphical user interface of the present invention.
Figure 8B:
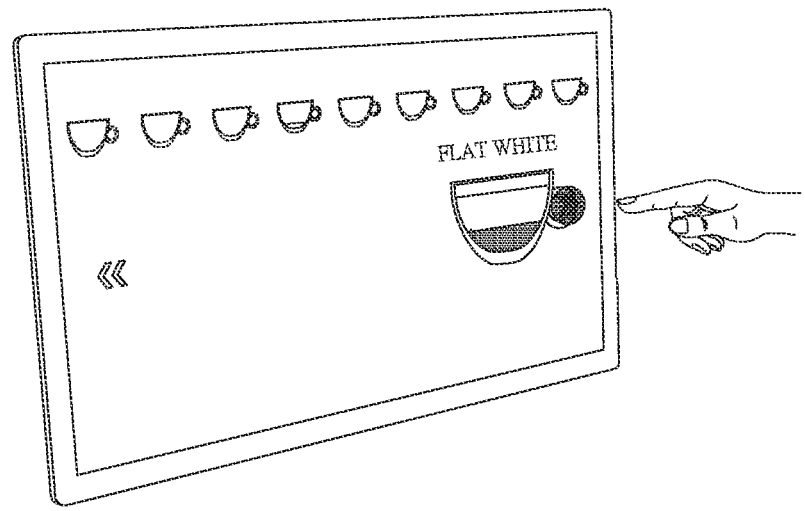

In FIG. 8A, the graphical user interface displays a cup of Flat White on the display device. At this time, a user's finger enters an effective sensing region of the hover touch device 1, a circular feedback image of the finger appears on a right-moving function key "»". In FIG. 8B, the user's finger holds still over the right-moving function key "»", and a hovering hold gesture event is triggered. Accordingly, a speaker 22 receives a hovering hold gesture event sound feedback signal and generates a hovering hold gesture event feedback sound, and the graphical user interface receives a hovering hold gesture event trigger signal, so that the graphical user interface displays on the display device that the cup of Flat White moves to the right.

Figure 8C:
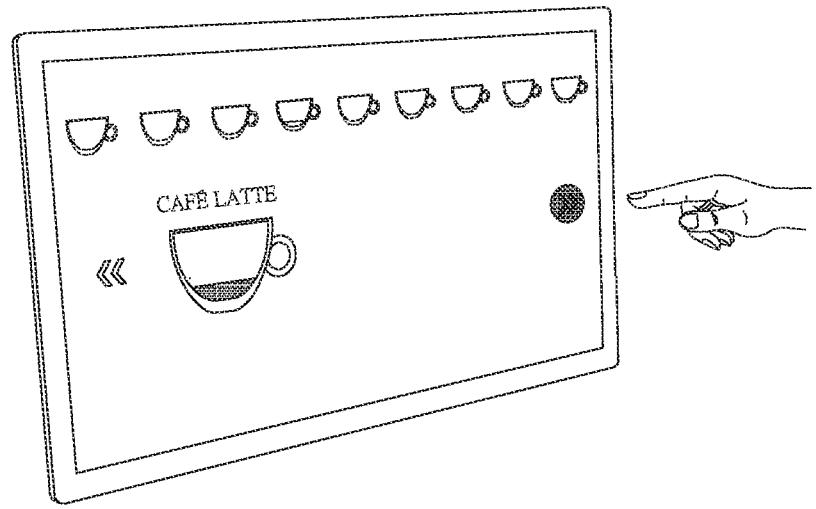
Figure 8D:
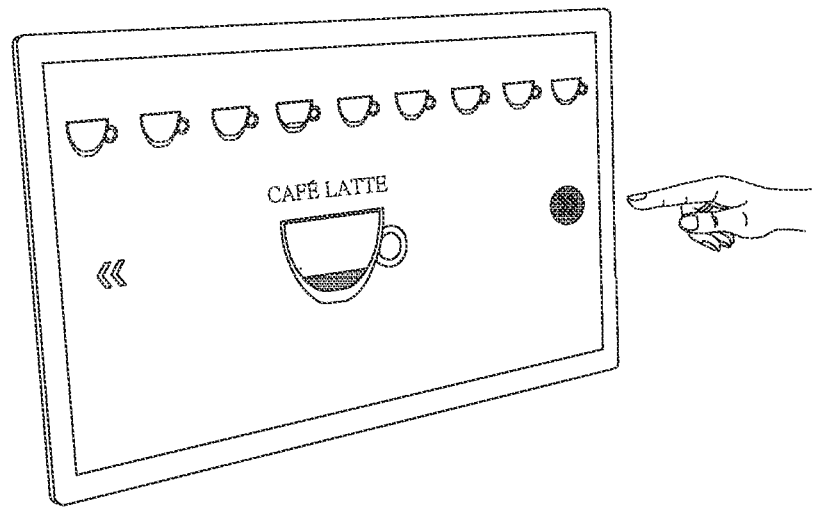
Figure 9:
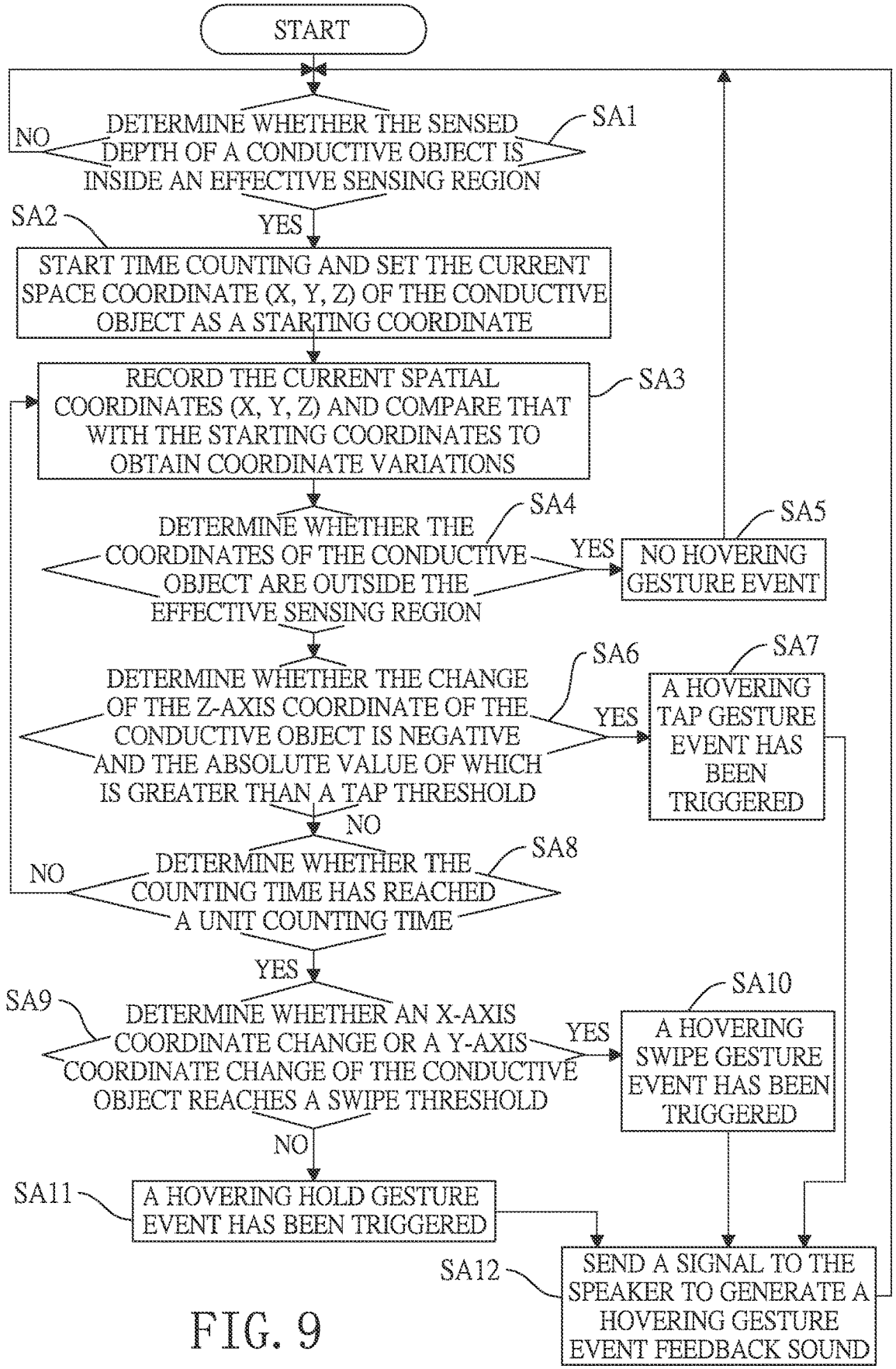
FIG. 9 is a flow chart of the hovering gesture determination incorporated with auditory feedback of the present invention.
Figure 10:
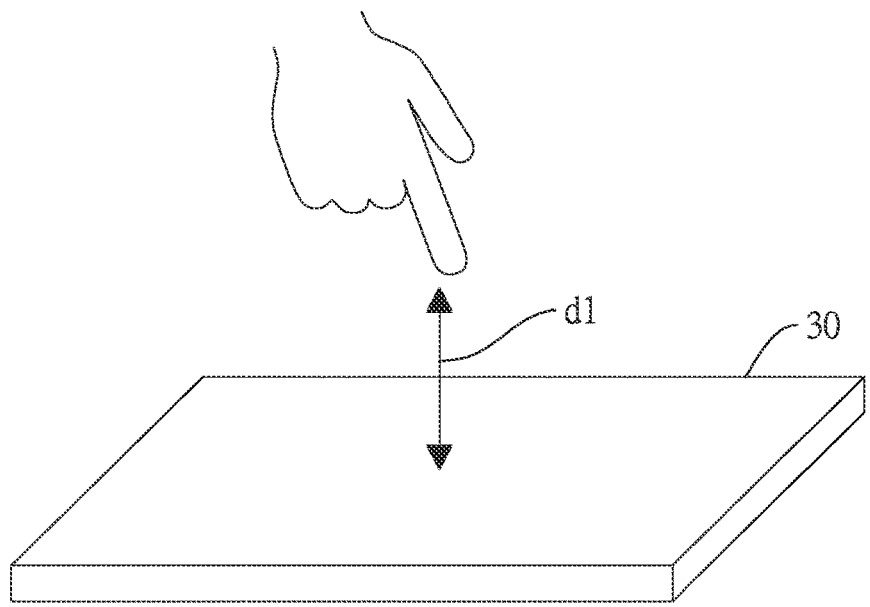
FIG. 10 is a schematic diagram of an application of a conventional hover touch device.
Figure 11:
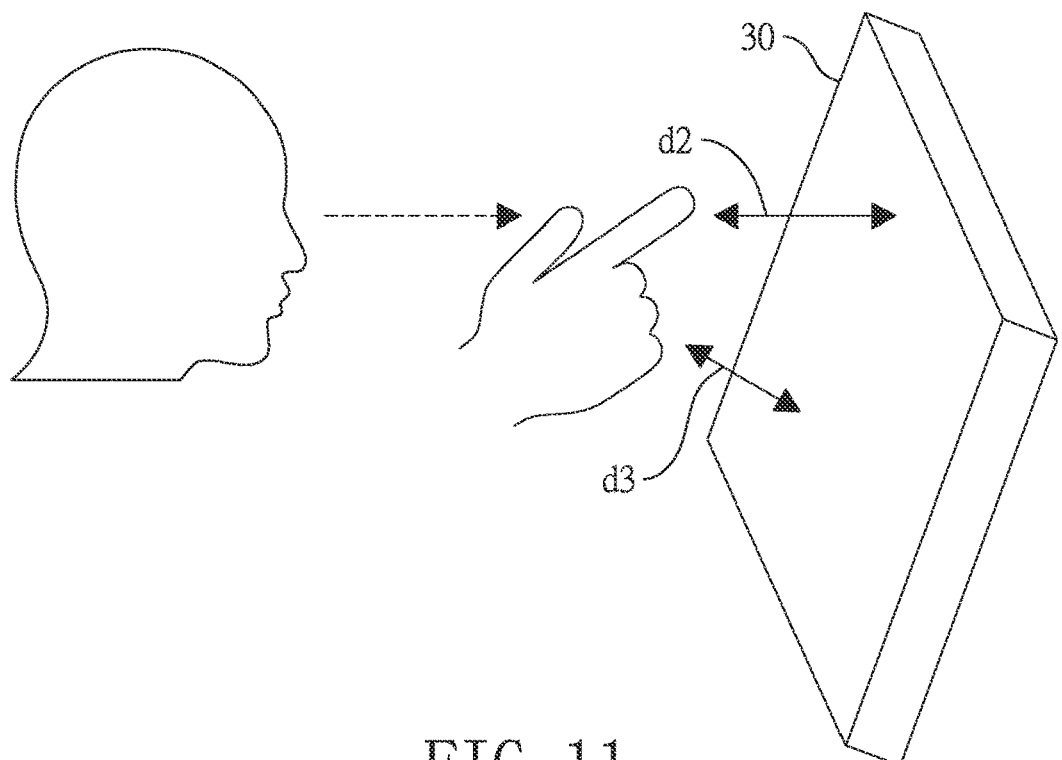
FIG. 11 is a schematic diagram of a false touch event or direct touch with the display device of a conventional hover touch device.

In FIG. 8C, the circular feedback image of the user's finger is holding still over the right-moving function key "»". At this time, the hovering hold gesture event is continuously triggered, and the speaker 22 continues to generate the hovering gesture event feedback sound, and the graphical user interface displays on the display device that the cup of Flat White continues to move out of the screen to the right side of the display device and a cup of Café Latte continues to move into the screen from the left side of the display device, and then in FIG. 8D, the circular feedback image of the user's finger is holding still over the right-moving function key "»", at this time, the hovering hold gesture event is continuously triggered, the speaker 22 continues to generate the hovering gesture event feedback sound, and the graphical user interface displays on the display device that the cup of Café Latte continues to move from the left side of the screen of the display device to the center of the screen. Please refer to FIG. 9. FIG. 9 shows a process flow of hovering gestures determination incorporated with auditory feedback of the present invention, which includes the following steps:

Step SA1: The embedded system 13 determines whether the sensed depth of a conductive object is inside an effective sensing region. If the sensed depth of the conductive object is outside the effective sensing region, the flow returns to step SA1;

Step SA2: The embedded system 13 resets a counting time to zero and starts time counting, and the embedded system 13 sets the current spatial coordinates (x,y,z) of the conductive object as starting coordinates;

Step SA3: The embedded system 13 records the current spatial coordinates (x,y,z) of the conductive object, and subtracts the starting coordinates from the current spatial coordinates to obtain and record the coordinate variations;

Step SA4: The embedded system 13 determines whether the coordinates of the conductive object are outside the effective sensing region. If the coordinates of the conductive object are inside the effective sensing region, the flow jumps to step SA6;

Step SA5: The embedded system 13 determines that there is no hovering gesture event, and the flow jumps to Step SA1;

Step SA6: The embedded system 13 determines whether the change of the z-axis coordinate of the conductive object is a negative value and whether the absolute value of the change of the z-axis coordinate is greater than a tap threshold. If the change amount of the z-axis coordinate of the conductive object is not a negative value and the absolute value of the change amount of the z-axis coordinate is less than or equal to the tap threshold, the flow jumps to step SA8;

Step SA7: The embedded system 13 determines that a hovering tap gesture event has been triggered, and the flow jumps to step SA12;

Step SA8: The embedded system 13 determines whether the counting time reaches a unit counting time. If the counting time does not reach a unit counting time, the flow jumps back to step SA3;

Step SA9: The embedded system 13 determines whether an x-axis coordinate change or a y-axis coordinate change of the conductive object, in the horizontal direction, reaches a swipe threshold. If neither the change of x-axis coordinate nor the change of y-axis coordinate reaches the hovering swipe threshold, the flow returns to step SA11;

Step SA10: The embedded system 13 determines that the hovering swipe gesture event has been triggered, and the flow jumps to Step SA12;

Step SA11: The embedded system 13 determines that a hovering hold gesture event has been triggered;

Step SA12: The embedded system 13 sends a hovering gesture event sound feedback signal to the speaker 22, so that the speaker 22 generates a hovering gesture event feedback sound, and the flow returns to step SA1.

From the above steps and embodiments, it can be known that the hover touch device with sensory feedback of the present invention is utilized in feeding back a current position of a user's finger to a related application with a feedback function, and the current position of the finger is displayed on a display device via a graphical user interface to form a visual feedback. At the same time, the hover touch device with sensory feedback of the present invention, after completing recognition of the hovering gesture, will additionally send a hovering gesture event sound feedback signal to a speaker to generate a hovering gesture event feedback sound to provide an auditory feedback; at the same time, the hover touch device with sensory feedback of the present invention will also generate and send a warning sound feedback signal to the speaker to generate a warning sound when the user's finger contacts the capacitive touch panel, and thereby the present invention solves and overcomes the problem that it is difficult for the user to correctly determine operating distances of his/her finger when operating the conventional hover touch product. And thus the purpose of the present invention can be achieved.

The aforementioned are preferred embodiments of the present invention. It should be noted that for those of ordinary skill in the art, without departing from the principles of the present invention, certain improvements and retouches of the present invention can still be made, which are nevertheless considered as within the protection scope of the present invention.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A hover touch device with sensory feedback, including:
a capacitive touch panel for sensing a conductive object adjacent to the capacitive touch panel;
a touch driver chip, electrically connected with the capacitive touch panel, driving the capacitive touch panel and measuring sensing signals induced by the conductive object, and generating and outputting a sensing information accordingly;
an embedded system, electrically connected to the touch driver chip and receiving the sensing information output by the touch driver chip;
the embedded system generating a sensed depth information of the conductive object according to the sensing information, and determining whether the conductive object is located inside an effective sensing region according to the sensed depth information, and when the conductive object is located inside the effective sensing region, the embedded system calculating spatial coordinates of the conductive object, and outputting the spatial coordinates to a graphical user interface, so that the graphical user interface displays a position feedback image on a display device based on the spatial coordinates of the conductive object;
wherein when the conductive object is located inside the effective sensing region, the embedded system continuously records the spatial coordinates in a unit counting time, and continues to determine whether a change of a vertical axis coordinate of the conductive object indicates that the conductive object continues to approach the capacitive touch panel and whether the change of the vertical axis coordinate reaches a tap threshold, when the change of the vertical axis coordinate of the conductive object indicates that the conductive object continues to approach the capacitive touch panel and the change of the vertical axis coordinate reaches the tap threshold, the embedded system outputs a hovering tap gesture event trigger signal.

2. The hover touch device with sensory feedback as claimed in claim 1, wherein when the conductive object is not located in the effective sensing region, the embedded system does not calculate the spatial coordinates of the conductive object.

3. The hover touch device with sensory feedback as claimed in claim 1, wherein the embedded system calculates the vertical axis coordinate of the conductive object according to the sensing information of the conductive object to obtain a vertical axis distance between the conductive object and the capacitive touch panel; when the vertical axis distance is less than a warning distance, the embedded system sends a warning sound feedback signal to a speaker, such that the speaker broadcasts a warning sound to notify that the conductive object touches the capacitive touch panel.

4. The hover touch device with sensory feedback as claimed in claim 1, wherein when the sensed depth information of the conductive object is less than an effective threshold, the embedded system determines that the conductive object is located inside the effective sensing region; and when the sensed depth information of the conductive object is greater than or equal to the effective threshold, the embedded system determines that the conductive object is outside the effective sensing region.

5. The hover touch device with sensory feedback as claimed in claim 1, wherein when the conductive object is located inside the effective sensing region, the embedded system continuously records the spatial coordinates of the conductive object in a unit counting time, and continuously determines whether the conductive object leaves the effective sensing region during the same unit counting time, and once the conductive object leaves the effective sensing region, the embedded system determines that there is no hovering gesture event.

6. The hover touch device with sensory feedback as claimed in claim 1, wherein the embedded system simultaneously outputs a hovering gesture event sound feedback signal to a speaker, so that the speaker generates a hovering gesture event feedback sound.

7. A hover touch device with sensory feedback, including:
a capacitive touch panel for sensing a conductive object adjacent to the capacitive touch panel;
a touch driver chip, electrically connected with the capacitive touch panel, driving the capacitive touch panel and measuring sensing signals induced by the conductive object, and generating and outputting a sensing information accordingly;
an embedded system, electrically connected to the touch driver chip and receiving the sensing information output by the touch driver chip;
the embedded system generating a sensed depth information of the conductive object according to the sensing information, and determining whether the conductive object is located inside an effective sensing region according to the sensed depth information, and when the conductive object is located inside the effective sensing region, the embedded system calculating spatial coordinates of the conductive object, and outputting the spatial coordinates to a graphical user interface, so that the graphical user interface displays a position feedback image on a display device based on the spatial coordinates of the conductive object;
wherein when the conductive object is located inside the effective sensing region, the embedded system firstly continuously records the spatial coordinates in a unit of counting time, and then based on the spatial coordinates recorded in the unit counting time, the embedded system determines whether an x-coordinate change in a horizontal x-axis or a y-coordinate change in a horizontal y-axis reaches a swipe threshold, when among the recorded spatial coordinates, the x coordinate change in the horizontal x-axis or the y coordinate change in the horizontal y-axis reaches the swipe threshold, the embedded system outputs a hovering swipe gesture event trigger signal.

8. The hover touch device with sensory feedback as claimed in claim 7, wherein the embedded system simultaneously outputs a hovering gesture event sound feedback signal to a speaker, so that the speaker generates a hovering gesture event feedback sound.

9. A hover touch device with sensory feedback, including:
a capacitive touch panel for sensing a conductive object adjacent to the capacitive touch panel;
a touch driver chip, electrically connected with the capacitive touch panel, driving the capacitive touch panel and measuring sensing signals induced by the conductive object, and generating and outputting a sensing information accordingly;
an embedded system, electrically connected to the touch driver chip and receiving the sensing information output by the touch driver chip;
the embedded system generating a sensed depth information of the conductive object according to the sensing information, and determining whether the conductive object is located inside an effective sensing region according to the sensed depth information, and when the conductive object is located inside the effective sensing region, the embedded system calculating spatial coordinates of the conductive object, and outputting the spatial coordinates to a graphical user interface, so that the graphical user interface displays a position feedback image on a display device based on the spatial coordinates of the conductive object;
wherein when the conductive object is located inside the effective sensing region, the embedded system firstly continuously records the spatial coordinates for a unit of counting time, and then based on the spatial coordinates recorded in the unit counting time, the embedded system determines whether the recorded spatial coordinates have neither an x coordinate change in a horizontal x-axis nor a y coordinate change in a horizontal y-axis reaching a swipe threshold, when the recorded spatial coordinates have neither the x coordinate change in the horizontal x-axis nor the y coordinate change in the horizontal y-axis reaching the swipe threshold, the embedded system outputs a hovering hold gesture event trigger signal.

10. The hover touch device with sensory feedback as claimed in claim 9, wherein the embedded system simultaneously outputs a hovering gesture event sound feedback signal to a speaker, so that the speaker generates a hovering gesture event feedback sound.

* * * * *